United States Patent
Jazdzewski et al.

(10) Patent No.: US 7,559,020 B2
(45) Date of Patent: Jul. 7, 2009

(54) METHODS AND SYSTEMS FOR PRESERVING UNKNOWN MARKUP IN A STRONGLY TYPED ENVIRONMENT

(75) Inventors: Charles P Jazdzewski, Redmond, WA (US); Jerry Dunietz, Seattle, WA (US); Oliver H. Foehr, Mercer Island, WA (US); Robert A. Relyea, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 11/026,341

(22) Filed: Dec. 30, 2004

(65) Prior Publication Data

US 2006/0150083 A1 Jul. 6, 2006

(51) Int. Cl.
*G06F 17/30* (2006.01)
*G06F 17/15* (2006.01)

(52) U.S. Cl. .................. 715/234; 715/237; 715/239; 715/255

(58) Field of Classification Search ................ 715/513, 715/523, 234, 237, 239, 255; 707/102, 103
See application file for complete search history.

(56) References Cited

U.S. PATENT DOCUMENTS

| | | | | |
|---|---|---|---|---|
| 6,085,198 A * | 7/2000 | Skinner et al. | ......... | 707/103 R |
| 6,507,856 B1 * | 1/2003 | Chen et al. | ................. | 715/513 |
| 7,096,224 B2 * | 8/2006 | Murthy et al. | .............. | 707/100 |
| 2001/0054172 A1 * | 12/2001 | Tuatini | .......................... | 717/1 |
| 2004/0015840 A1 * | 1/2004 | Walker | ....................... | 717/108 |

FOREIGN PATENT DOCUMENTS

EP 1376389 2/2004

OTHER PUBLICATIONS

Mark Wutka, JOX v1.1, published: Nov. 29, 2000—under Lesser General Public License http://web.archive.org/web/20001208014200/http://www.wutka.com/download/jox-1.11.zip (JOXBeanReader, pp. 1-2), (JOXSAXBeanInputCLS, pp. 1-6), (JOXBeanOutput.java, p. 5).*
Ralf Westphal, XML and Object Persistence: Roll Your Own, published: Sep. 1999, pp. 1-14 (main document) and pp. 1-2 (schema document). http://www.xml.com/1999/09/serialization/index3.html.*
Eric M. Dashofy, "Issues in Generating Data Bindings for an XML Schema-Based Language", publisher: Department of Information and Computer Science, published: 2001, pp. 1-4.*

* cited by examiner

*Primary Examiner*—Stephen S Hong
*Assistant Examiner*—Wilson Tsui
(74) *Attorney, Agent, or Firm*—Lee & Hayes, PLLC

(57) ABSTRACT

Methods and systems for preserving unknown markup in a strongly typed environment are described. In but one embodiment, XML-based markup that may contain XML-based elements that are both known and unknown is received. A strongly typed tree that is associated with the known XML-based elements is instantiated and a weakly typed tree that is associated with both the XML-based known and unknown elements is instantiated. The strongly and the weakly typed trees are then correlated in a manner that preserves the unknown XML-based elements.

13 Claims, 6 Drawing Sheets

METHODS AND SYSTEMS FOR PRESERVING UNKNOWN MARKUP IN A STRONGLY TYPED ENVIRONMENT

TECHNICAL FIELD

This invention pertains to methods and systems that process XML and XML-based markup languages.

BACKGROUND

Typically, XML and XML-based markup languages are extensible. In some systems, the extensibility mechanism is based on the concept of known namespaces and unknown namespaces which can be implemented by any arbitrary agent that processes the markup. Unknown namespaces can contain arbitrary extensions that a particular agent may or may not understand. When multiple agents are chained together to form a pipeline where a stream of markup is passed through each single agent sequentially, and the agents modify the stream somehow, the introduced extensibility mechanism presents a challenging problem known as "markup preservation"—that is, preserving the markup that any one particular agent may not understand.

In some systems, the set of known and unknown namespaces can differ between the individual agents in a pipeline. In such a system, it becomes important for any agent that comes before another to preserve the markup from any unknown namespace because a subsequent agent that understands the namespace may want to process content from the namespace.

Traditional processing agents for XML-based markup languages often choose to implement a document object model (DOM) tree. A DOM tree is a weakly typed structure that contains one node for each element tag found in the markup. Because every node is weakly typed, it is a fairly straightforward process for an agent to create nodes of unspecified type that hold markup for unknown namespaces, skip these nodes during processing, and then subsequently serialize them back to markup which is passed to the next agent.

In strongly typed environments, processing unknown namespaces is not as straightforward. More specifically, in strongly typed environments, it is difficult if not impossible to preserve markup associated with unknown namespaces because no definitive type can be assigned to that mark up. A further complication can exist when, for example, XML parsers further process the markup by translating the markup into an intermediate different form, such as a binary form. In such situations, agents using the markup typically cannot modify this translation step.

Accordingly, this invention arose out of concerns associated with providing solutions to the markup preservation problem in strongly typed environments and/or those environments that involve an intermediate translation stage.

SUMMARY

Methods and systems for preserving unknown markup in a strongly typed environment are described. In but one embodiment, XML-based markup that may contain XML-based elements that are both known and unknown is received. A strongly typed tree that is associated with the known XML-based elements is instantiated and a weakly typed tree that is associated with both the XML-based known and unknown elements is instantiated. The strongly and the weakly typed trees are then correlated in a manner that preserves the unknown XML-based elements.

DETAILED DESCRIPTION

Overview

The methods and systems described below provide means that can preserve markup associated with unknown namespace elements in the context of a strongly typed environment. In at least some embodiments, this is accomplished by instantiating a so-called strongly typed tree that is associated with XML-based elements that are known, and a weakly typed tree that is associated with XML-based known and unknown elements. A correlation process is then utilized to correlate the strongly typed and weakly typed trees during deserialization of the XML-based markup. A de-correlation process then reserializes the XML-based markup in a manner that preserves any unknown namespace elements.

The embodiments described below are described in the context of a computing environment. Various embodiments can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Various embodiments may be implemented in computer system configurations other than a PC. For example, various embodiments may be realized in hand-held devices, multi-processor systems, microprocessor-based or programmable consumer electronics, network PCs, minicomputers, mainframe computers and the like. Alternately or additionally, various embodiments may also be practiced in distributed computing environments, where tasks are performed by remote processing devices that are linked through a communications network. In a distributed computing environment, program modules may be located in both local and remote memory storage devices.

Figure 6:
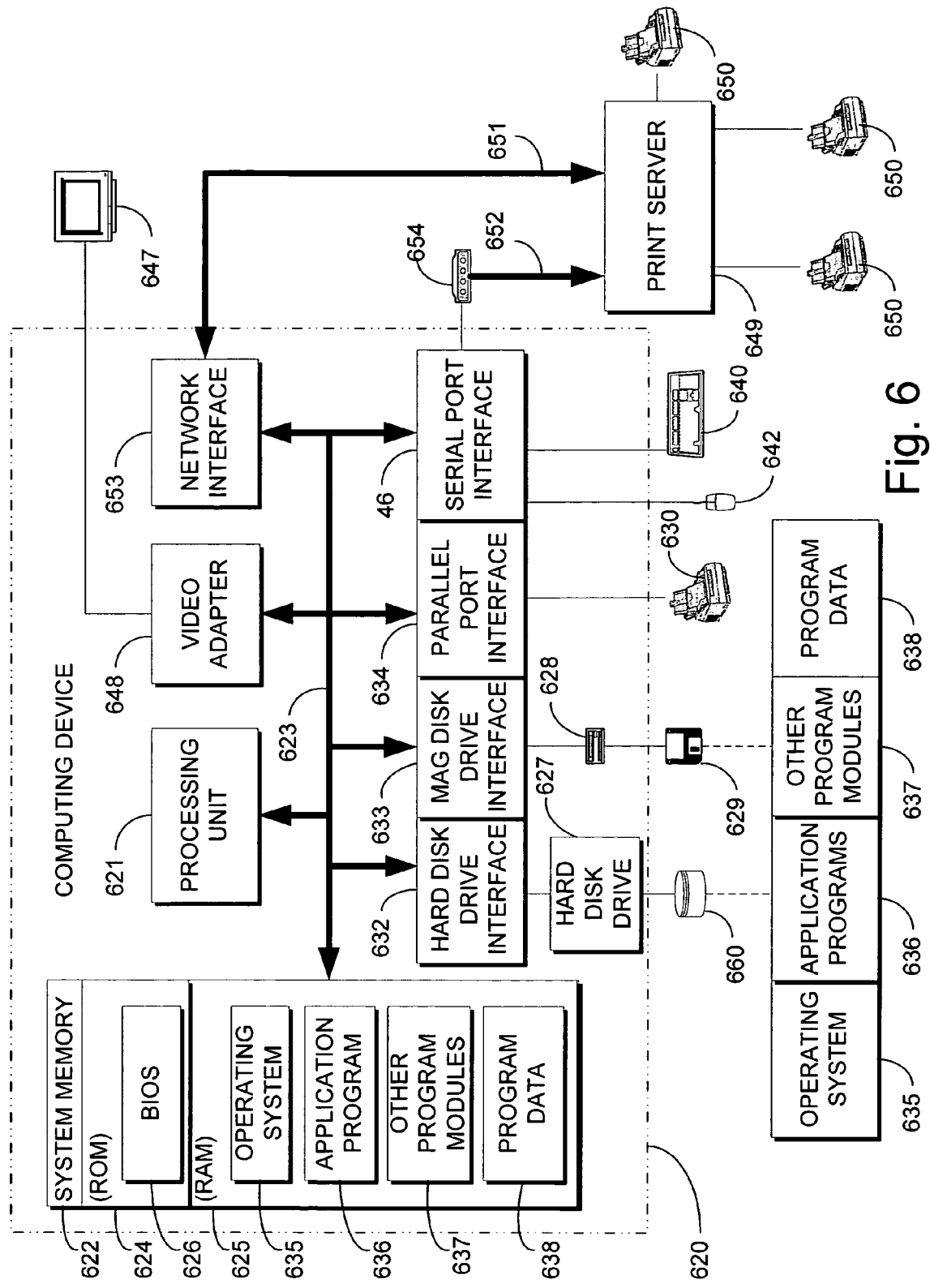
FIG. 6 illustrates an exemplary computing device in connection with which one or more embodiments can be implemented.

Although the various embodiments may be incorporated into many types of computing environments as suggested above, a description of but one exemplary environment appears in FIG. 6 in the context of an exemplary general-purpose computing device in the form of a conventional computing device which is described in more detail at the end of this document under the heading "Exemplary Computing Environment".

Characteristics of a Strongly Typed Environment

Figure 1:
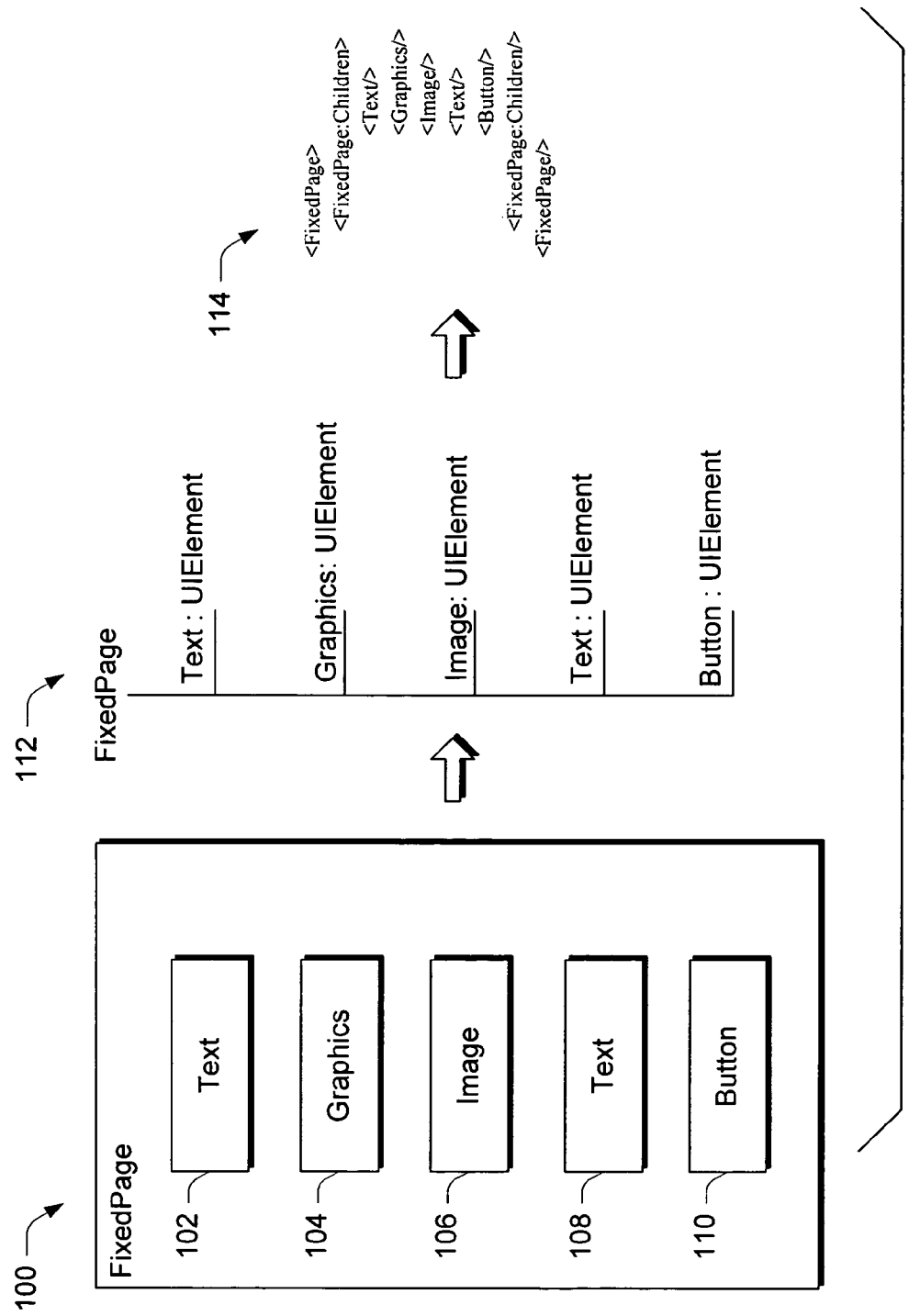
FIG. 1 illustrates aspects of a strongly typed environment.

As an example of a strongly typed environment, consider the following in connection with FIG. 1. Assume that a page of content 100, such as one that might be displayed on a computer display, includes text 102, graphics 104, an image 106, some additional text 108 and a clickable button 110. This content can be represented (in memory) as a tree 112 whose root is FixedPage, and whose nodes are Text, Graphics, Image, Text and Button. The XML representation of this tree is shown at 114.

In tree 112, each of the elements is represented by an instance of an object of a class. In this example, FixedPage is an instance of a class, and the class is defined as having a property called children. The children property is strongly typed and it is strongly typed as a collection of some large class. Each of the elements of the tree is a class name which is a sub-class of, or derived from some base class which, in this example is UIElement. In this strongly typed environment, the FixedPage class instance children properties can only hold things that are derived from the base class UIElement.

Example of One Way That Extended Markup can be Lost

Figure 2:
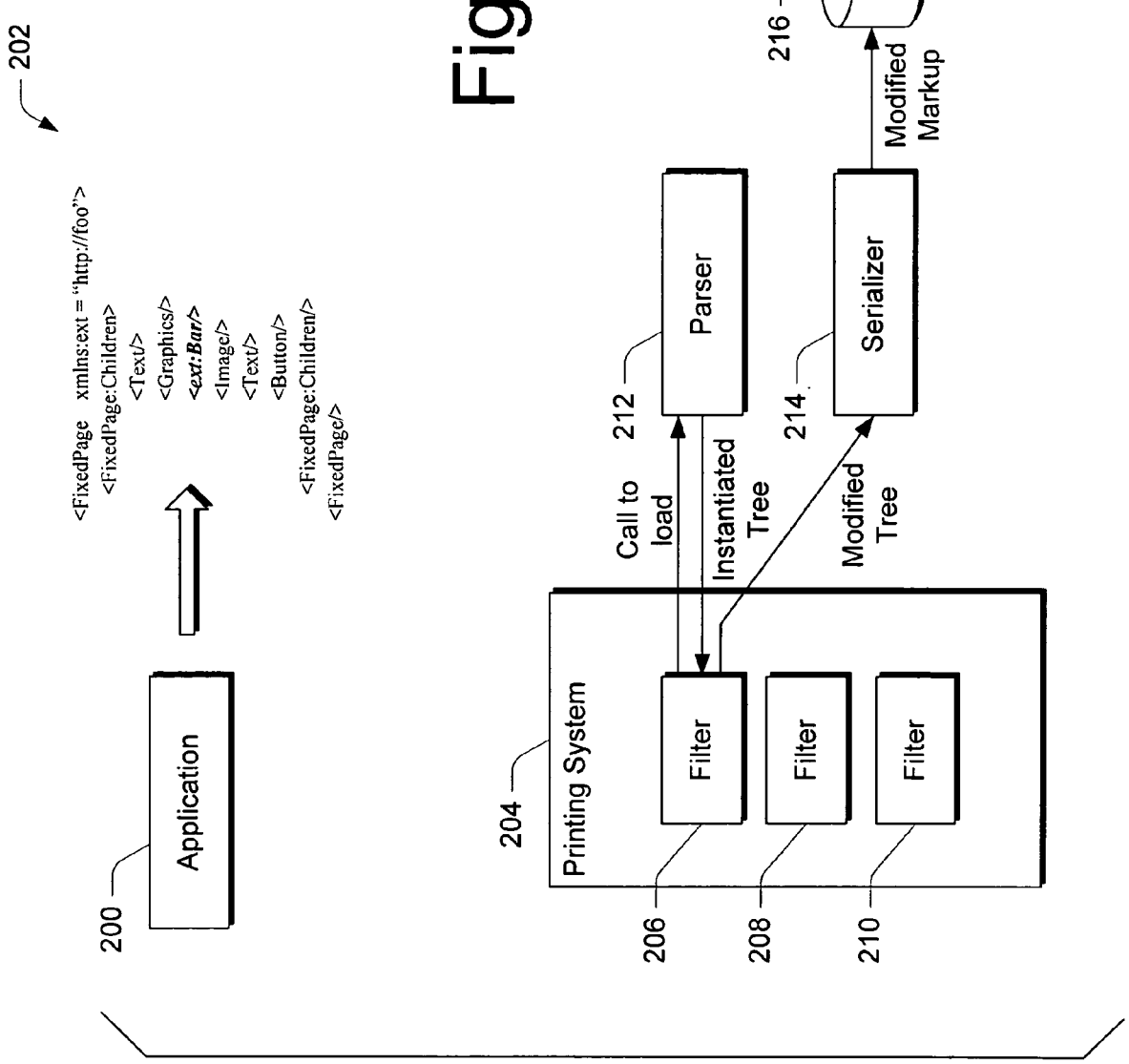
FIG. 2 illustrates individual components that can operate in a strongly typed environment.

Now consider the scenario shown in FIG. 2 in which an application 200 generates markup 202 that is to be processed by a printing system 204. In this example, printing system 204 comprises a collection of filters or agents 206, 208 and 210. The filters typically load the markup for a page or a document, modify it somehow, and then provide it for processing by the next filter. As an example, a filter could add a watermark to a page, re-arrange pages in a different order, scale, rotate, adjust images on the page, and the like.

One example of a printing system is Microsoft's WinFX system. In the WinFX system, there are standard software components such as a parser 212 and a serializer 214 that process XML or, more accurately in the WinFX context, XAML (Extensible Application Markup Language). In systems like this and others, filter 206 calls parser 212 to load the markup. Responsively, parser 212 returns an instantiated tree of elements (such as tree 112 in FIG. 1) to the filter. The filter then processes the tree, modifies it somehow, and provides the modified tree to serializer 214. The serializer 214 then serializes the modified tree into a modified markup which is then kept in some manner, as represented by data store 216. The next filter, in this case filter 208, then calls the parser 212 to load the modified markup and operates on its associated tree as described above, continuing the process. After the last filter has completed its processing, the modified tree is serialized by the serializer 214 and can be provided to a consuming device, such as a printer.

Notice that in this particular scenario, application 200 has inserted, into markup 202, the element "ext:Bar". Perhaps this element is to be used to control, in some manner, the consuming device. For example, if the consuming device is a printer, then this element might be associated with selecting a particular type of ink to use for printing the document. In a strongly typed environment, however, this element or associated namespace is not known, and hence will be lost after the first filter.

Preserving Extended Markup in a Strongly Typed Environment

In accordance with the embodiment about to be described, unknown elements in a strongly typed environment are preserved during processing of the XML (or XAML in the implementation example described below) by instantiating a strongly typed tree that is associated with XML-based elements that are known, and a weakly typed tree that is associated with XML-based known and unknown elements. The two trees are then correlated with one another so that the weakly typed tree includes the unknown elements and correlates with the strongly typed tree's known elements. As the two trees remain correlated, the weakly typed tree can be re-serialzed into XML (or XAML) in a manner that preserves the unknown markup.

Figure 3:
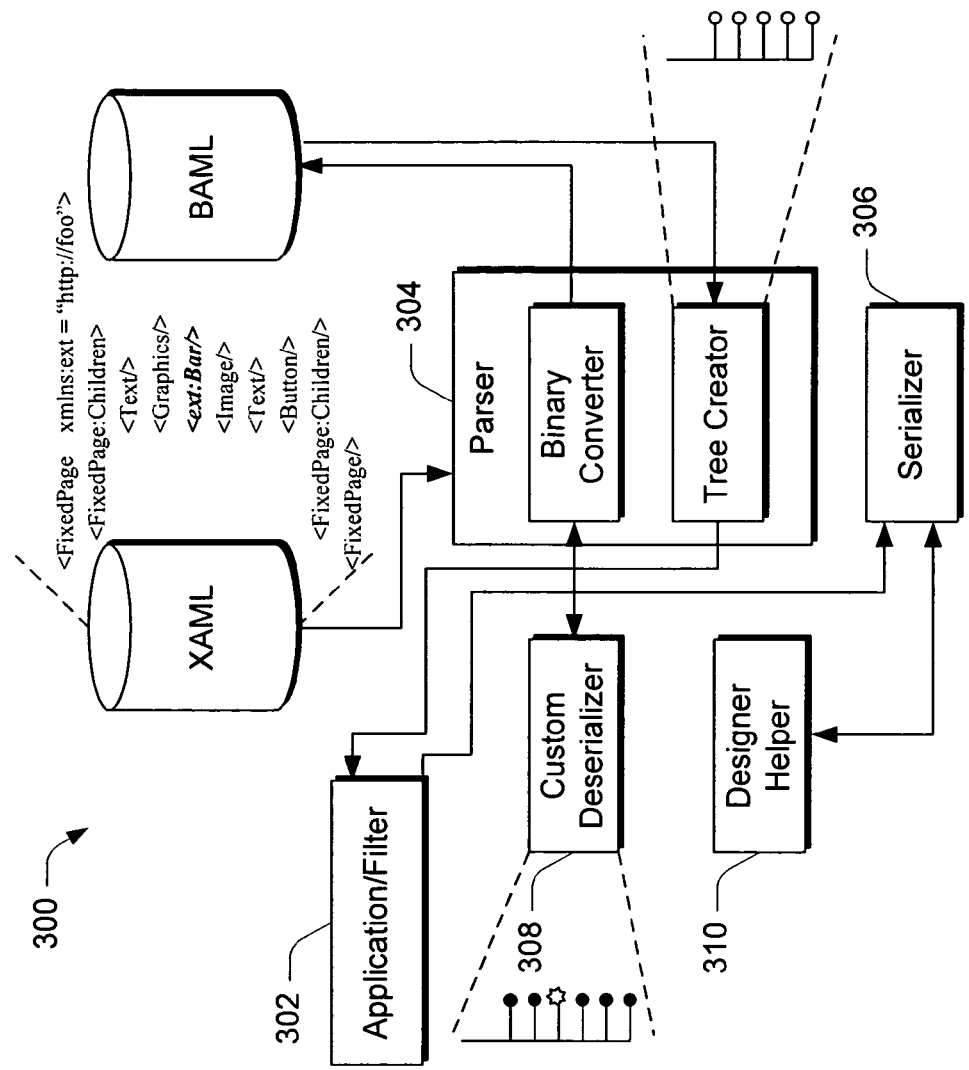
FIG. 3 illustrates exemplary components in accordance with one embodiment.

As an implementation example, consider FIG. 3 which provides an implementation in the context of Microsoft's WinFX platform. It is to be appreciated and understood that the implementation about to be described is not to be used to limit application of the claimed subject matter to a specific implementation or platform. Rather, the implementation example is provided to illustrate how various inventive principles described herein can be implemented in but one particular environment.

In this particular example, system 300 is a software-based system and includes an application/filter 302, a parser 304 having a binary convertor component and a tree creator component, a serializer 306, a custom deserializer 308 and a designer helper 310.

In the context of the WinFX platform, parser 304 is a WinFX object which, in connection with other components that are not illustrated, parses XML-based markup, matches known element tags to WinFX classes and instantiates WinFX class objects. Parser 304 returns a strongly typed WinFX tree. Serializer 306 is a WinFX object that takes a strongly typed WinFX tree and serializes it into XML markup.

Custom Deserializer 308 (also considered a Custom XAML Deserializer in this context) is a WinFX object that receives notifications for each markup element parsed by parser 304. The Custom Deserializer can perform an arbitrary computation. After processing a markup element, it returns a result code that instructs parser 304 whether it should use the element or skip the element.

Designer Helper 310 is a WinFX object that is called by Serializer 306 before the markup for a strongly typed WinFX object is created. The Designer Helper can emit additional markup.

In operation, system 300 works in the following way. Assume that the XML (or XAML) of FIG. 2 is to be processed by system 300. Note that in the FIG. 2 example, an unknown XML element "ext:Bar" has been injected into an otherwise known collection of XML elements. When the XML is received by the parser 304, two things happen in this particular scenario.

First, the XML is processed by the parser's binary converter and converted into a binary representation of the XML which, in this example, is referred to as BAML. The binary representation is then saved. In the binary conversion process, however, all elements that are not known, by virtue of the processing that takes place in the strongly-typed environment, are ignored. Hence, as the XML is processed, when the "ext:Bar" element is encountered, it would be ignored and effectively lost in the binary conversion.

Second, the parser's tree creator takes the binary representation that was saved and processes the binary representation to instantiate an object tree that is a strongly typed tree. This is diagrammatically indicated to the right of the tree creator component. This tree can then be handed to the application/filter 302 for processing.

In the illustrated and described embodiment, at the same time that the binary conversion process takes place, the binary convertor calls the custom deserializer 308 for each node or element encountered in the XML. In this example, the custom deserializer inserts the extensibility into the process. More specifically, for each node that is parsed by the parser 304, the customer deserializer is called and it decides how the nodes or elements should be processed. In the case in which nodes are known (i.e. nodes associated with known elements such as Text, Graphics and the like), the custom deserializer 308 returns to the parser and indicates that the parser is to process the node as usual. If, on the other hand, there is an unknown node or element, the custom deserializer returns to the parser and indicates that the parser is to skip the node and not transfer it into the binary representation.

In addition to indicating to parser 304 that it is to skip an unknown node or element, the custom deserializer builds a weakly typed DOM tree. That is, the deserializer builds the weakly typed DOM tree from within the extensibility point. This weakly typed DOM tree is diagrammatically to the left of the custom deserializer 308.

In this particular example, for every known element, the deserializer creates a placeholder node in the weakly typed tree, e.g. a null object. In the illustrated example, these place holders are indicated as small black-filled circles. For unknown elements (such as the "ext:Bar" element), the deserializer creates a "preserve" node that contains the original markup, i.e. the text string of markup "<ext:Bar/>". This is diagrammatically indicated by the star node in the weakly typed tree.

At this point in the process, there are two trees—one strongly typed tree that contains nodes associated with known elements, and one weakly typed tree with nodes that contain placeholders for known elements, and nodes associated with the unknown markup.

Now that both trees are created, each tree is walked, node by node, for purposes of correlating the nodes of the weakly typed tree with the nodes of the strongly typed tree. If a node in the weakly typed tree has a place holder for a strongly-typed object, then that node in the weakly typed tree is set to the corresponding object or node in the strongly typed tree. If, on the other hand, the node in the weakly typed tree is not set to a place holder for a strongly-typed object in the strongly typed tree, then the weakly typed tree node is skipped and the process advances to the next node in the weakly typed tree. If this next node in the weakly typed tree has a placeholder associated with strongly typed object in the strongly typed tree, then the weakly typed tree node is set to the corresponding object or node in the strongly typed tree, and the process continues until both trees have been walked. Accordingly, this process effectively populates the weakly typed tree with the objects or nodes from the strongly typed tree.

After the correlation processing, a fully populated weakly typed tree is returned. Once the correlation has been established between the weakly and strongly typed trees, the strongly typed tree can be returned to application 302 and be operated upon by the application. For example, the application may modify or delete a node on the strongly typed tree.

Once the application has operated upon the strongly typed tree in some manner, the modified strongly typed tree is provided to serializer 306 for reserialization into XML (or XAML).

Figure 4:
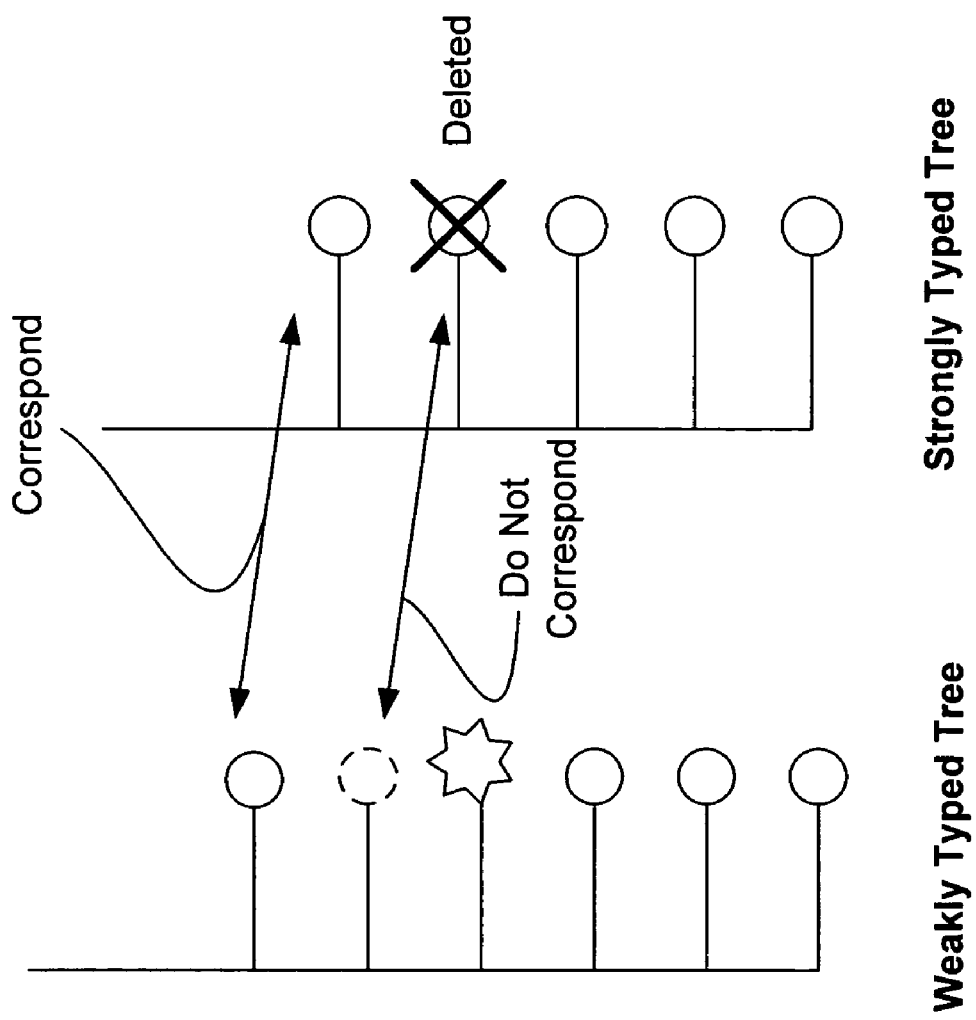
FIG. 4 illustrates exemplary weakly typed and strongly typed trees.

On reserialization, the reverse of the correlation processing is performed. As an example, assume that application 302 deleted the second node down in the strongly typed tree. This is diagrammatically indicated in FIG. 4. Here, the serializer finds which nodes in the strongly typed tree correspond to which nodes in the weakly typed tree, and then correlates the weakly typed tree with the strongly typed tree.

For example, on serialization, the serializer 306 walks the strongly and weakly typed trees and modifies the nodes on the weakly typed tree to reflect the processing that has taken place on the strongly typed tree. In this particular example, the serializer encounters the first node in the strongly typed and weakly typed trees. If these nodes correspond to each other, then the serializer moves to the next node in each tree to check for correspondence. In this particular example, the next node in the strongly typed tree was deleted by the application. In response, the serializer finds the corresponding node in the weakly typed tree and deletes it. This is diagrammatically indicated in the figure by the dashed line.

Continuing, the serializer locates the next node in the strongly typed tree—here the third one down (including the deleted node). The serializer then finds the corresponding node in the weakly typed tree. Here, however, there is an additional node (i.e. the one that corresponds to "ext:Bar") between the weakly typed tree's last processed corresponding node and the current corresponding node. In this case, if the intervening node is not one that corresponds to a strongly typed node, it is serialized as raw XML.

The serializer then continues to process the strongly typed and weakly typed trees, thus serializing the weakly typed tree in conformance to the modified strongly typed tree. Hence, in this manner, serialization can occur and the extended elements which are not those associated with the strongly typed environment can be preserved.

While this example describes serialization of the weakly typed tree to correspond to its modified strongly typed tree, it is to be appreciated that the above-described methodology can be used in a manner in which various rules can be applied throughout the serialization process to affect the ultimately serialized XML that corresponds to the weakly typed tree. For example, some rules might be specified that define which nodes should and should not be serialized. In this manner, the various rules can drive the serialization process so that the serialized XML that is produced is of a desired and predictable form—particularly in view of the fact that in the strongly typed environment there may be elements injected into the XML that are not known for that environment.

Exemplary Methods

Figure 5:
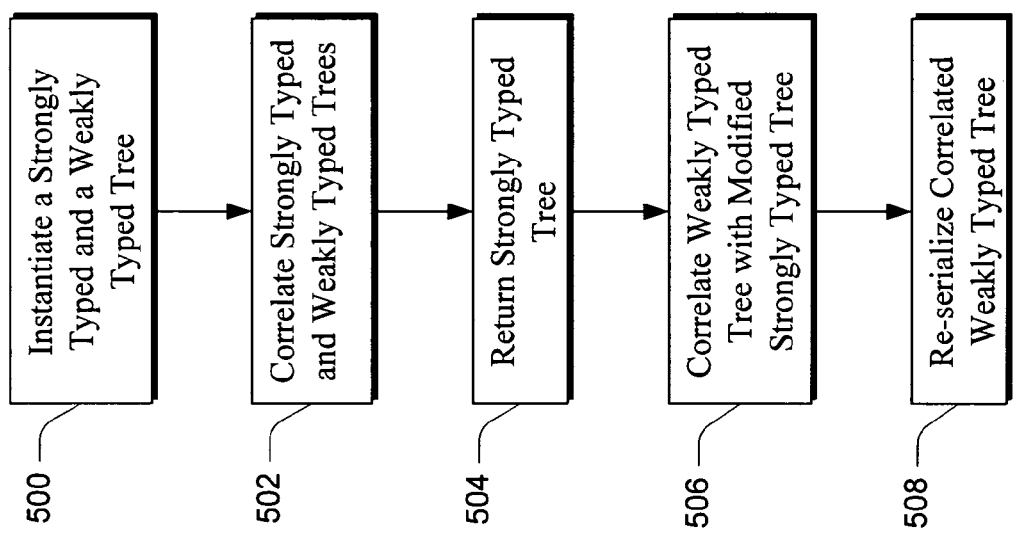
FIG. 5 is a flow diagram that describes steps in a method in accordance with one embodiment.

FIG. 5 is a flow diagram that describes steps in a method in accordance with one embodiment. The method can be implemented in any suitable hardware, software, firmware or combination thereof. In but one example, the method can be implemented in connection with a system such as the one described immediately above. It is to be appreciated and understood, however, that other systems can implement this method without departing from the spirit and scope of the claimed subject matter.

Step 500 instantiates a strongly typed and a weakly typed tree. In this example, the strongly typed tree contains elements or nodes that are known within the strongly typed environment; and the weakly typed tree contains nodes that are associated with strongly typed elements, as well as nodes that are associated with elements that have been injected into the corresponding XML and which are not necessarily known within the particular strongly typed environment. Step 502 correlates the strongly typed and the weakly typed trees so that the weakly typed tree has nodes that correspond to the known nodes on the strongly typed tree.

Correlation of the trees can be performed in any suitable manner. In the process described above, the weakly typed tree contains place holders for the nodes that correspond to the strongly typed elements and correlation takes place by walking both trees, in parallel, and inserting or making entries for the weakly typed nodes that correspond to the strongly typed nodes.

Once the trees are created and correlated, step 504 returns the strongly typed tree an application, collection of filters or some other component so that the strongly typed tree can be operated upon to provide a modified strongly typed tree. Once the strongly typed tree has been operated upon, it is returned for correlation with the weakly typed tree. Accordingly, step 506 correlates the weakly typed tree with the returned modified strongly typed tree and step 508 re-serializes the correlated weakly typed tree in a manner that preserves the injected unknown elements.

Pseudo Code Example

The pseudo code example below provides but one way that the methodology described above can be implemented. The pseudo code will be understood by the skilled artisan and constitutes but one exemplary implementation of the method described above. It is to be appreciated and understood that other means of implementing the described embodiments can be utilized without departing from the spirit and scope of the claimed subject matter.

```
class TreeNode
{
   bool isPlaceHolderForStronglyTyped;
   object stronglyTypedObject;
   string preserveMarkupElement;
      TreeNodeCollection children;
   }
   class PreserveMarkupLoader:CustomXamlDeserializer
   {
      TreeNode weaklyTypedTree;
   PreserveMarkupLoader( )
   {
      weaklyTypedTree = new TreeNode( );
      // Create an empty tree for markup preservation
   }
      SerializationAction LoadNode( reader, node )
   // Called for each parsed XML Node
      {
      If node is from an unknown namespace that should be
preserved:
         •   get markup string for unknown element (through
             reader or by collecting multiple nodes)
         •   Add a new TreeNode to the weaklyTypedTree:
             o   Set TreeNode.isPlaceHolderForStronglyTyped
                 to false
             o   Set the TreeNode.preserveMarkupElement to
                 the preserved markup
         •   return SerializationAction skip
      If node is from a known namespace that should be
instantiated by strongly-typed runtime environment:
         •   Add a new TreeNode to weaklyTypedTree
             o   Set TreeNode.isPlaceHolderForStronglyTyped
                 to true
             o   return SerializationAction Normal
      }
      void PopulateTreeWithReferences( Document doc )
      {
      •   Walk the tree of doc and weaklyTypedTree in parallel
          O   If TreeNode in weaklyTypedTree has
              isPlaceHolderForStronglyType==true, set
              stronglyTypedObject reference to the object from
              doc tree. Advance current node in both trees
          O   If TreeNode in weaklyTypedTree has
              isPlaceHolderForStronglyTyped==false, advance
              current node in weaklyTypedTree only
      }
   }
   main( )
   {
      // . . . Parser invocation
      PreserveMarkupLoader preserveMarkupLoader = new
PreserveMarkupLoader( );
      ParserContext pc = new ParserContext( );
      Populate pc with PreserveMarkupLoader
      Document doc = Parser.LoadXaml( stream, pc, . . . ) as
Document;
      PreserveMarkupLoader.PopulateTreeWidthReferences( doc );
      // We now have two things:
      1) doc is the strongly typed Document tree (or FixedPage, or
         whatever strongly typed tree we want to deal with)
      2) preserveMarkupLoader contains a weaklyTypedTree in which each
         node is one of two things:
         a. Reference node to an object in the strongly typed tree
         b. Node holding the preserved markup
```

-continued

```
Serialization is handled in a symmetric fashion:
   •   A subclass PreserveMarkupSerializer of DesignerHelper is
       created that takes the weaklyTypedTree from
       preserveMarkupLoader as input
   •   The Serializer receives an instance of
       PreserveMarkupSerializer
   •   The SerializeNode( ) method of PreserveMarkupSerializer
       finds the position of the TreeNode in the weaklyTypedTree
       that references the currently serialized element.
   •   If there is another TreeNode between that element and
       the previous one, inspect all TreeNode covered by the
       gap; If TreeNode.isPlaceHolderForStronglyTyped==false,
       then serialize TreeNode.preserveMarkupElement as raw xml.
}
```

Exemplary Computing Environment

As noted above, various embodiments can be implemented in connection with a computing device such as the one shown in FIG. 6 at 620. Computing device 620 includes a processing unit 621, a system memory 622, and a system bus 623 that couples various system components including the system memory to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help to transfer information between elements within the computing device 620, such as during start-up, is stored in ROM 624. The computing device 620 further includes a hard disk drive 627 for reading from and writing to a hard disk 660 and a magnetic disk drive 628 for reading from or writing to a removable magnetic disk 629.

The hard disk drive 627 and magnetic disk drive 628 are connected to the system bus 623 by a hard disk drive interface 632 and a magnetic disk drive interface 633, respectively. The drives and their associated computer-readable media provide nonvolatile storage of computer readable instructions, data structures, program modules and other data for the computing device 620. Although the exemplary environment described herein employs a hard disk 660 and a removable magnetic disk 629, it will be appreciated by those skilled in the art that other types of computer readable media which can store data that is accessible by a computer, such as optical disk drives and disks, magnetic cassettes, flash memory cards, digital video disks, Bernoulli cartridges, random access memories, read only memories, and the like may also be used in the exemplary operating environment.

A number of program modules may be stored on the hard disk 660, magnetic disk 629, ROM 624 or RAM 625, including an operating system 635, one or more applications programs 636, other program modules 637, and program data 638. A user may enter commands and information into the computing device 620 through input devices such as a keyboard 640 and a pointing device 642. Other input devices (not shown) may include a microphone, joystick, game pad, satellite dish, scanner, or the like. These and other input devices are often connected to the processing unit 621 through a serial port interface 646 that is coupled to the system bus, but may be connected by other interfaces, such as the parallel port 634, game port or a universal serial bus (USB). A monitor 647 or other type of display device is also connected to the system bus 623 via an interface, such as a video adapter 648. In addition to the monitor, computing devices typically include other peripheral output devices, such as speakers and a printer 630 connected through the parallel port interface 634 to the system bus 623.

The computing device 620 may operate in a networked environment using logical connections to one or more remote computers, such as a print server 649. The print server 649 may be another computing device, a server, a router, a network computing device, a peer device or other common network node, and typically includes many of the elements described above relative to the computing device 620, although, often a print server 649 is dedicated to routing print requests from the computing device 620 to attached printers 650. The logical connections depicted in FIG. 1 include a local area network (LAN) 651 and a wide area network (WAN) 652. Such networking environments are commonplace in offices, enterprise-wide computer networks, intranets and the Internet.

When used in a LAN networking environment, the computing device 620 is connected to the local network 651 through a network interface or adapter 653. When used in a WAN networking environment, the computing device 620 typically includes a modem 654 or other means for establishing communications over the WAN 652. The modem 654, which may be internal or external, is connected to the system bus 623 via the serial port interface 646. In a networked environment, program modules depicted relative to the computing device 620, or portions thereof, may be stored in the remote memory storage device. It will be appreciated that the network connections shown are exemplary and other means of establishing a communications link between the computers may be used.

In the description above, the embodiments are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the various embodiments were described in the foregoing context, it is not meant to be limiting as those of skill in the art will appreciate that various acts and operations described above may also be implemented in hardware.

Conclusion

The methods and systems described above can preserve markup associated with unknown namespace elements in the context of a strongly typed environment. In at least some embodiments, this is accomplished by instantiating a so-called strongly typed tree that is associated with XML-based elements that are known, and a weakly typed tree that is associated with XML-based known and unknown elements. A correlation process is then utilized to correlate the strongly typed and weakly typed trees during deserialization of the XML-based markup. A de-correlation process then reserializes the XML-based markup in a manner that preserves any unknown namespace elements.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method for preserving unknown XML-based elements so that the unknown XML-based elements are not dropped when reading XML-based markup into a memory in a strongly typed environment, wherein the method is implemented by a processor executing computer-executable instructions stored in a memory, the method comprising:
   in a strongly typed environment:
   receiving XML-based markup that may contain XML-based elements that are both known and unknown;
   instantiating a strongly typed tree that is associated with the known XML-based elements;
   instantiating a weakly typed tree that is associated with both the XML-based known and unknown elements, wherein the act of instantiating a weakly typed tree comprises:
      for every known element in the XML-based markup, creating a placeholder node in the weakly typed tree; and
      for every unknown element in the XML-based markup, creating a node that preserves the unknown markup; and
   correlating the strongly type tree and the weakly typed tree by populating the weakly typed tree with objects or nodes from the strongly typed tree in a manner that preserves the unknown XML-based elements.

2. The method of claim 1, wherein the act of creating a node that preserves the unknown element comprises associating a text string of the unknown element with said node.

3. The method of claim 1 further comprising after creating said placeholder node, for each placeholder node, setting an individual placeholder node to a corresponding node in the strongly typed tree.

4. A computer-implemented method for preserving unknown XML-based elements so that the unknown XML-based elements are not dropped when reading XML-based markup into a memory in a strongly typed environment, wherein the method is implemented by a processor executing computer-executable instructions stored in a memory, the method comprising:
   in a strongly typed environment:
   receiving XML-based markup that may contain XML-based elements that are both known and unknown;
   instantiating a strongly typed tree that is associated with the known XML-based elements;
   instantiating a weakly typed tree that is associated with both the XML-based known and unknown elements;
   correlating the strongly type tree and the weakly typed tree by populating the weakly typed tree with objects or nodes from the strongly typed tree in a manner that preserves the unknown XML-based elements; and
   returning said strongly typed tree to a component so that the component can operate on the strongly typed tree to provide a modified strongly typed tree.

5. The method of claim 4 further comprising serializing the modified strongly typed tree into XML-based markup.

6. The method of claim 5 further comprising during serialization, re-correlating the weakly typed tree with the modified strongly typed tree.

7. The method of claim 5 further comprising during serialization, allowing one or more rules to be applied that define which nodes should and should not be serialized.

8. A system comprising:

one or more computer-readable media; and one or more software-implemented components embodied on the one or more computer-readable media and configured to:

receive, in a strongly typed environment, XML-based markup that may contain XML-based elements that are both known and unknown;

instantiate a strongly typed tree that is associated with the known XML-based elements;

instantiate a weakly typed tree that is associated with both the XML-based known and unknown elements; and correlate the strongly typed tree and the weakly typed tree by populating the weakly typed tree with objects or nodes from the strongly typed tree in a manner that preserves the unknown XML-based elements;

wherein said one or more software-implemented components comprise:

a parser for parsing the XML-based markup; and a deserializer that receives notifications for each markup element parsed by the parser, wherein the deserializer is configured to instantiate the weakly typed tree and correlate the strongly and weakly typed trees.

9. The system of claim 8, wherein said parser for parsing the XML-based markup is further configured for converting said XML-based markup into a binary representation.

10. The system of claim 9, and parser for parsing the XML-based markup, and converting said XML-based markup into a binary representation, is further configured for instantiating the strongly typed object tree using the binary representation.

11. A system comprising:

one or more computer-readable media; and one or more software-implemented components embodied on the one or more computer-readable media and configured to:

receive, in a strongly typed environment, XML-based markup including XML-based markup elements that are both known and unknown, wherein a known XML element maps to a class, and wherein an unknown XML element is not assigned a definitive type;

instantiate a strongly typed object tree from known XML-based markup elements, wherein the objects are instantiated from classes defined prior to receiving the markup;

instantiate a weakly typed tree from both the XML-based known and unknown markup elements; and correlate the strongly typed tree and the weakly typed tree by populating the weakly typed tree with objects or nodes from the strongly typed tree in a manner that preserves the unknown XML-based markup elements, wherein said one or more software-implemented components comprise:

a parser for parsing the XML-based markup; and a deserializer that receives notifications for each markup element parsed by the parser, wherein the deserializer is configured to instantiate the weakly typed tree by creating a placeholder node in the weakly typed tree for every known markup element in the XML-based markup, and creating a node that preserves the unknown markup for every unknown markup element in the XML-based markup.

12. A system comprising:

one or more computer-readable media; and one or more software-implemented components embodied on the one or more computer-readable media and configured to:

receive, in a strongly typed environment, XML-based markup including XML-based markup elements that are both known and unknown, wherein a known XML element maps to a class, and wherein an unknown XML element is not assigned a definitive type;

instantiate a strongly typed object tree from known XML-based markup elements, wherein the objects are instantiated from classes defined prior to receiving the markup;

instantiate a weakly typed tree from both the XML-based known and unknown markup elements; and correlate the strongly typed tree and the weakly typed tree by populating the weakly typed tree with objects or nodes from the strongly typed tree in a manner that preserves the unknown XML-based markup elements, wherein said one or more software-implemented components comprise a parser for parsing the XML-based markup and returning the strongly typed object tree to another component so that the other component can operate on the strongly typed object tree to provide a modified strongly typed object tree.

13. The system of claim 12, further comprising a serializer configured to serialize the modified strongly typed object tree into XML-based markup and, during serialization, re-correlate the weakly typed tree with the modified strongly typed object tree.

* * * * *